(12) United States Patent
Hsieh

(10) Patent No.: US 6,658,744 B2
(45) Date of Patent: Dec. 9, 2003

(54) PROTECTION LID TO FACILITATE REPLACING SAW BLADE OF A PNEUMATIC SAW

(76) Inventor: Yu-Fu Hsieh, P. O. Box 96-405, Taipei 106 (TW)

( * ) Notice: Subject to any disclaimer, the term of this patent is extended or adjusted under 35 U.S.C. 154(b) by 47 days.

(21) Appl. No.: 10/071,614

(22) Filed: Feb. 6, 2002

(65) Prior Publication Data

US 2003/0145473 A1 Aug. 7, 2003

(51) Int. Cl.[7] .................... B23D 49/10; B27B 19/00
(52) U.S. Cl. ..................................... 30/392; 30/277.4
(58) Field of Search ..................... 30/272.1, 277.4, 30/392, 393, 394

(56) References Cited

U.S. PATENT DOCUMENTS

| 3,146,810 | A | * | 9/1964 | Keesling ................. 30/394 |
| 3,754,330 | A | * | 8/1973 | Anderson et al. ......... 30/392 |
| 4,864,727 | A | * | 9/1989 | Chu .................... 30/272.1 |
| 6,006,435 | A | * | 12/1999 | Chien ................... 30/392 |
| 6,178,645 | B1 | * | 1/2001 | Lock .................. 30/277.4 |

* cited by examiner

Primary Examiner—Hwei-Siu Payer

(57) ABSTRACT

A protection lid to facilitate replacing saw blade of a pneumatic saw, in which the front end of the body is furnished with a fixed member covered with a protection lid; the transmission shaft of the pneumatic saw and the chuck cylinder are mounted in a recess portion; the saw blade extends out through a gap between two guide blocks on the front end of the fixed member; the protection lid mounted on the fixed member has two elongate holes on both sides thereof, which are opposite to a fastening screw of the chuck cylinder; the elongate holes facilitate a hexagon wrench to reach the fastening screw upon replacing saw blade.

1 Claim, 6 Drawing Sheets

US 6,658,744 B2

PROTECTION LID TO FACILITATE REPLACING SAW BLADE OF A PNEUMATIC SAW

BACKGROUND OF THE INVENTION

1. Field of the Invention

This invention relates to a pneumatic saw, and particularly to a protection lid to facilitate replacing saw blade of a pneumatic saw.

2. Description of the Prior Art

In a conventional pneumatic saw, the front end of the body thereof is usually furnished with a fixed member, which is covered with a protection lid; however, the shape of the protection lid varies with the shape of every pneumatic saw; both the fixed member and the protection lid are furnished with recess portions respectively; the front ends of the recess portions are furnished with a rectangular recess portion for mounting a saw guide assembly (including two guide blocks, an upper fastening plate and a lower fastening plate) to facilitate a saw blade to mount through; when the saw blade moves back and forth, the saw blade would not swing or bias; the protection lid mounted on the fixed member is assembled together with the saw guide assembly by means of a screw on the front end of the lid body so as to provide the transmission assembly with a cover and protection function; however, when a saw blade has to be replaced, the protection lid mounted on the fixed member must be removed first so as to let a hexagon wrench reach a fastening screw on one side of the chuck cylinder; such a removing procedure is deemed a cumbersome procedure.

SUMMARY OF THE INVENTION

The prime object of the present invention is to provide a protection lid to facilitate replacing saw blade of a pneumatic saw, in which the front end of the body has a fixed member covered with a protection lid mounted in place with a screw; both sides of the protection lid are furnished with two elongate holes respectively opposite to a fastening screw; the elongate holes facilitate a hexagon wrench to reach the fastening screw on the chuck cylinder upon replacing the saw blade.

Another object of the present invention is to provide a protection lid to facilitate replacing saw blade of a pneumatic saw, in which the front end of the body has a fixed member covered with a protection lid; between the fixed member and the protection lid, there is a rectangular recess portion mounted with a saw guide assembly, and when a saw blade is replacing, no other parts are necessary to remove.

A further object of the present invention is to provide a protection lid to facilitate replacing saw blade of a pneumatic saw, in which a space is furnished between the fixed member and the protection lid for mounting a transmission shaft, a chuck cylinder, a saw blade, and a space for the saw blade to move back and forth; the protection lid is mounted on the fixed member by means of a screw; the protection lid has a lid body extended with a front plate having a slot for receiving a saw blade.

A still further object of the present invention is to provide a protection lid to facilitate replacing saw blade of a pneumatic saw, in which a space is furnished between the fixed member and the protection lid for mounting a transmission shaft, a chuck cylinder, a saw blade and a space for the saw blade to move back and forth; the protection lid is mounted on the fixed member by means of a pivot, while other end of the protection lid is furnished with a screw to be fastened to the saw guide assembly so as to fix the protection lid on the fixed member.

DETAILED DESCRIPTION OF THE PREFERRED EMBODIMENT

Figure 1:
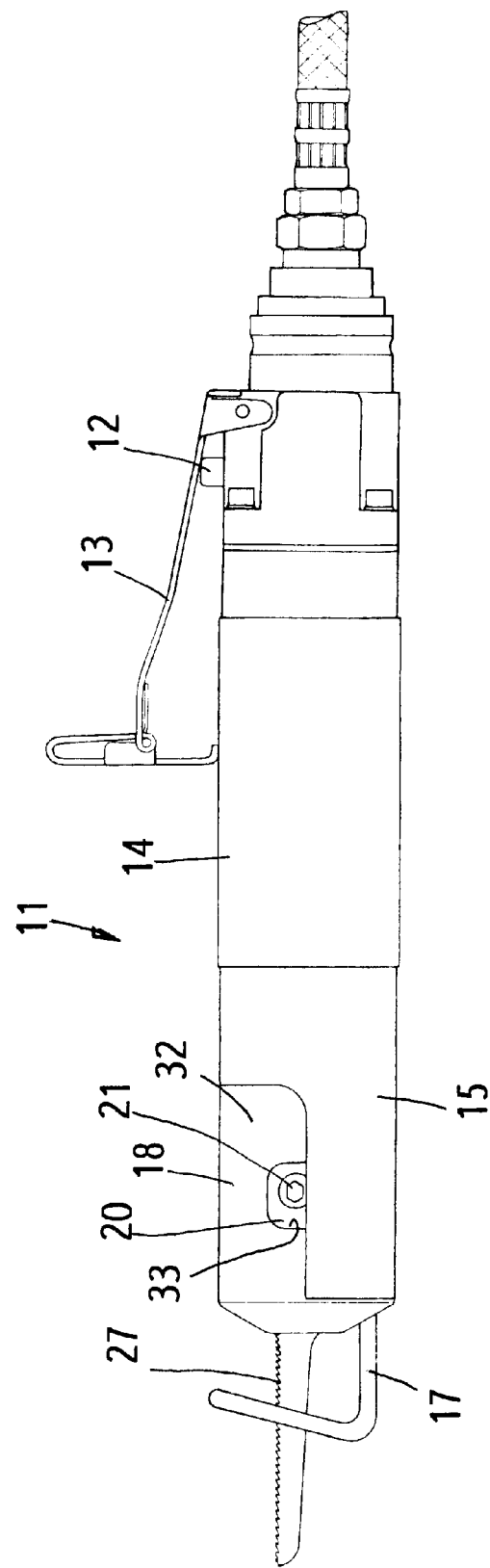
FIG. 1 is a plane view of a pneumatic saw according to the present invention.
Figure 2:
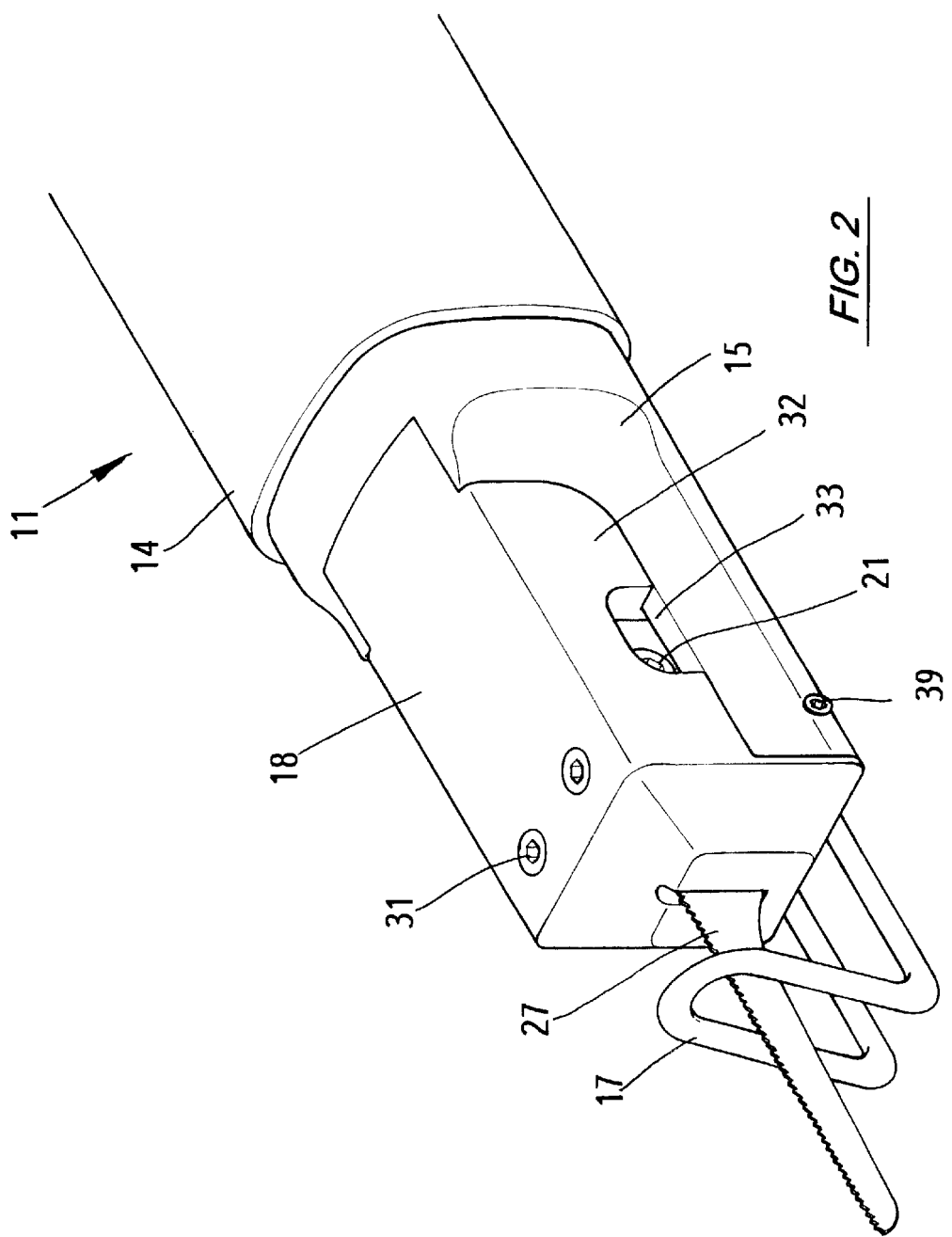
FIG. 2 is a perspective view of the present invention, showing the front structure of the pneumatic saw.
Figure 3:
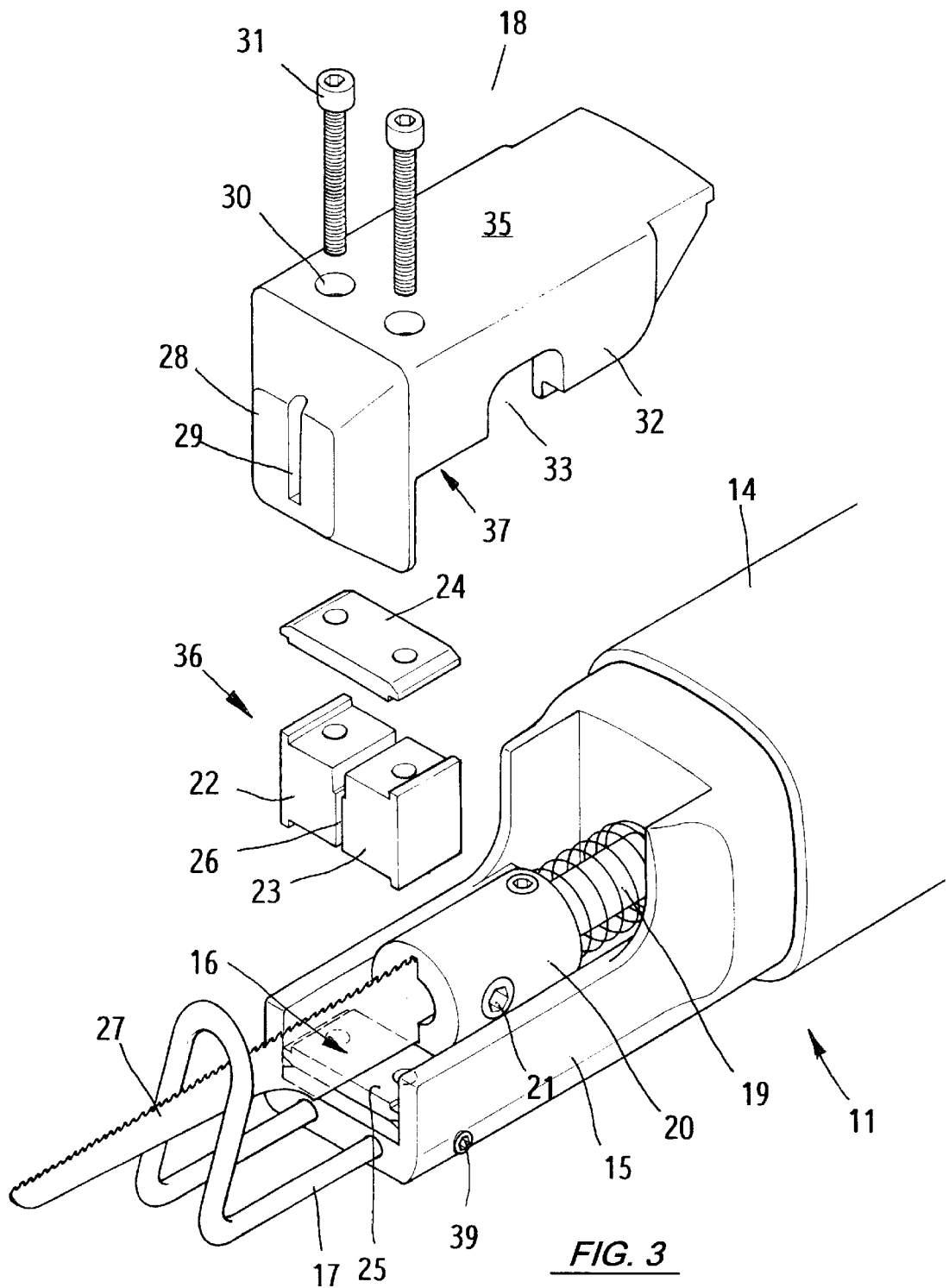
FIG. 3 is a disassembled view of the present invention, showing the structure of the front assembly of the pneumatic saw.
Figure 4:
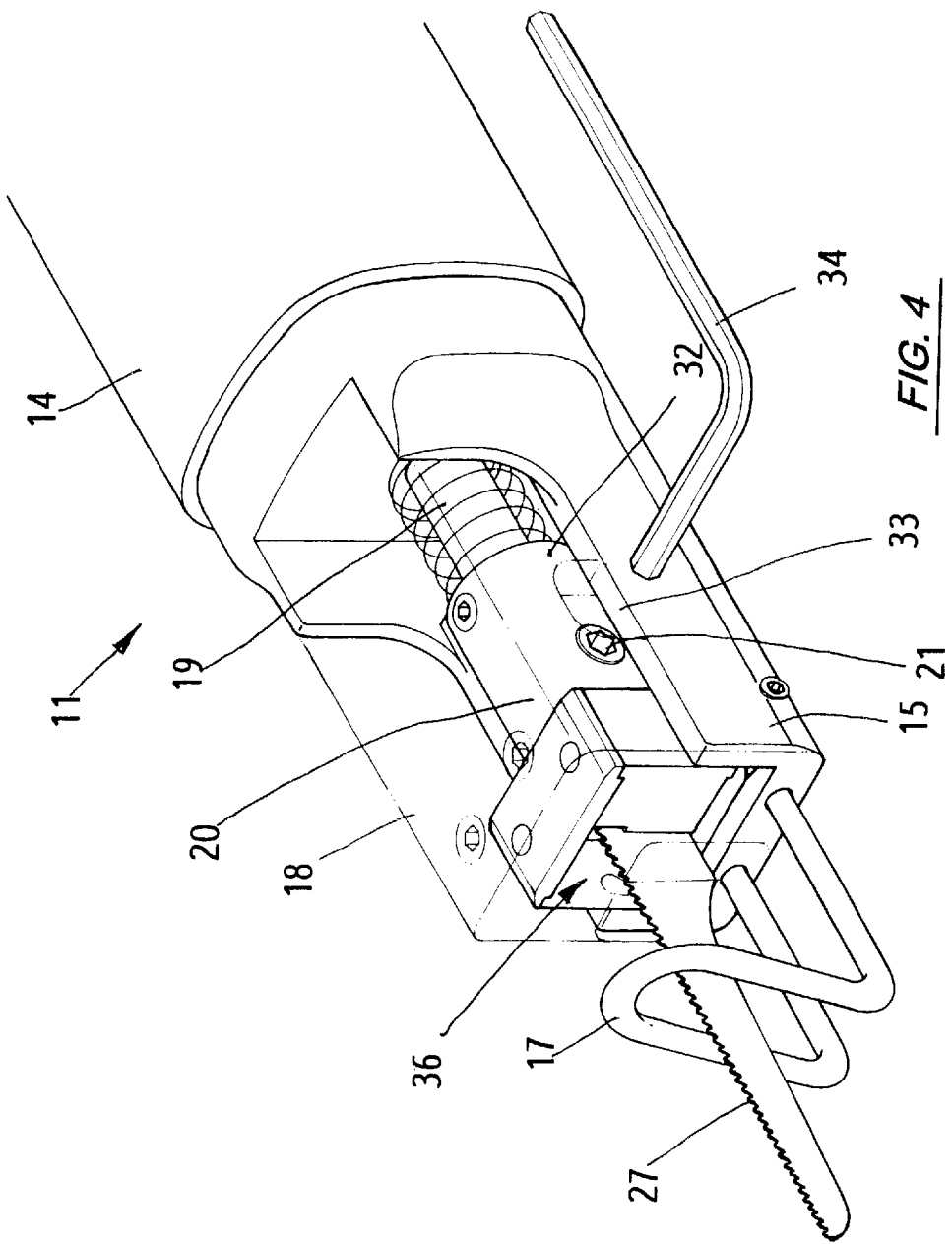
FIG. 4 is a sectional view of the present invention, showing the relation between the protection lid and the chuck cylinder.

This invention relates to a protection lid to facilitate replacing saw blade of a pneumatic saw; as showing in FIGS. 1 to 4, the pneumatic saw 11 has a body 14 with a valve 12 on the rear end of the body 14. The valve 12 has a cock 13 for controlling the air pressure volume to enter the pneumatic saw. The inside of the body 14 is mounted with a piston connected with a transmission shaft 19 so as to transmit power to the chuck cylinder 20; the outer end of the chuck cylinder 20 is plugged with a saw blade 27, and one side of the chuck cylinder 20 is furnished with a fastening screw 21 to fasten the saw blade 27 in the chuck cylinder 20. When the piston moves back and forth, the saw blade 27 will be driven to move back and forth for cutting operation.

A fixed member 15 mounted on the front end of the body 14 is an extended part, or fixed in place with screw; one side of the fixed member 15 is furnished with a recess portion 16, which is mounted with a saw-guide assembly 36 having two guide blocks 22 and 23, and an upper fastening plate 24; a gap 26 is furnished between the two guide blocks 22 and 23 for receiving the saw blade 27; one end of the saw blade 27 is plugged in the slot of the chuck cylinder 20, and then is fastened in place with a fastening screw 21. The front end of the fixed member 15 is mounted with a protection rod 17, which is fixed in place with a fastening screw 39 in a hole on one side of the fixed member 15.

The protection lid 18 mounted to the fixed member 15 has a recess portion 37 facing the fixed member 15; both side plates 32 of the protection lid 18 are closely mounted along the edge of the fixed member 15.The front end of the protection lid 18 has a plate 28 with a slot 29 in the center thereof. Before the protection lid 18 mounted on the fixed member 15, the saw blade 27 has to be mounted through the slot 29 so as to have the plate 28 mounted closely on the end of the fixed member 15 for protection.

Figure 6:
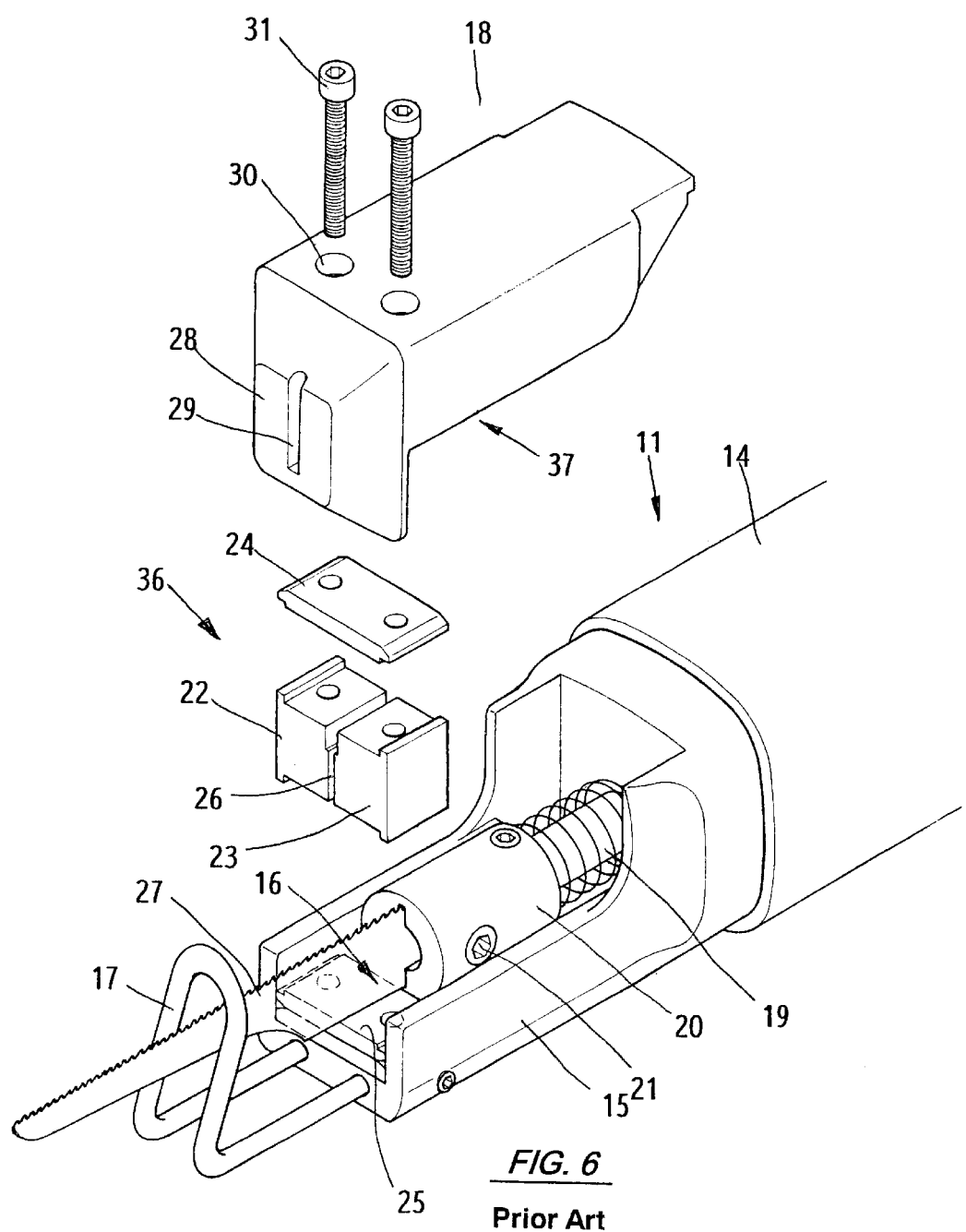
FIG. 6 is a disassembled view of a conventional pneumatic saw.

As shown in FIG. 6, the chuck cylinder 20 of the recess portion 16 of the fixed member 15 should be mounted first with a saw blade 27 fixed in place with a fastening screw 21, before the protection lid 18 is mounted on the fixed member 15; then, the recess portion 16 of the fixed member 15 is mounted, in order, with the lower fastening plate 25, the two guide blocks 22 and 23 and the upper fastening plate 24; after the slot 29 of the plate 28 is mounted with the saw blade 27, and is put on the side plate of the fixed member 15, screws 31 are put in the sunk holes 30 of the protection lid 18, the though holes of the upper fastening plate 24, the two guide blocks 22 and 23, and the lower fastening plate 25; finally, the screws 31 are fastened to the front end of the recess portion 16 so as to have the protection lid 18 fastened on the fixed member 15. The protection lid 18 can provided the pneumatic saw 11 with decorative and protection function; however, when the saw blade 27 is replaced, the aforesaid assembling procedures must be done in reverse order, and it is deemed cumbersome.

As shown in FIGS. 1 to 4, the protection rod 17 may be plugged into the round holes on the front end of the fixed member 15 before the saw blade 27 being mounted in the chuck cylinder 20; the protection rod can be fastened in place with fastening screws. The saw guide assembly 36 is mounted on the front end of the recess portion 16 of the fixed member 15. The protection lid 18 and the front plate 28 can be mounted on the side and the front end of the fixed member 15; screws may be plugged into the sunk holes 30 of the protection lid 18, and through the through holes of the saw guide assembly 36, and then the screws are fastened to the front end of the recess portion 16 of the fixed member 15 so as to provide the pneumatic saw 11 with protection on the side and front thereof; simultaneously, the saw guide assembly 36 in the recess portion 16 will be fastened in place, too.

When mounting the saw blade 27, one end of the saw blade 27 is plugged into the slot 29 of the front plate 28 of the protection lid 18, and then through the gap 26 between the two guide blocks 22 and 23 of the saw guide assembly 36 and the chuck cylinder 20. Both sides of the chuck cylinder 20 are furnished with a fastening screw 21, which is opposite to two elongate holes 33 on both side plates 32 of the protection lid 18; the elongate holes 33 can provide an elongate through space so as to receive a hexagon wrench 34 to fasten a fastening screw 21 for fixing the saw blade 27 in the chuck cylinder 20. When the cock 13 of the pneumatic saw 11 is actuated, the piston therein will drive the transmission shaft 19 to move back and forth so as to have the saw blade 27 moved back and forth.

The elongate holes 33 of two side plates 32 of the protection lid 18 are designed to fit the stroke distance of the chuck cylinder 20, i.e., the stop position of the chuck cylinder 20 will be within a position opposite to the elongate holes 33 so as to facilitate the hexagon wrench 34 to reach the fastening screw 21 in the chuck cylinder 20 upon the saw blade 27 being removed or replaced; in that case, the saw blade 27 can be replaced easily without removing the protection lid 18 and the saw guide assembly 36.

Figure 5:
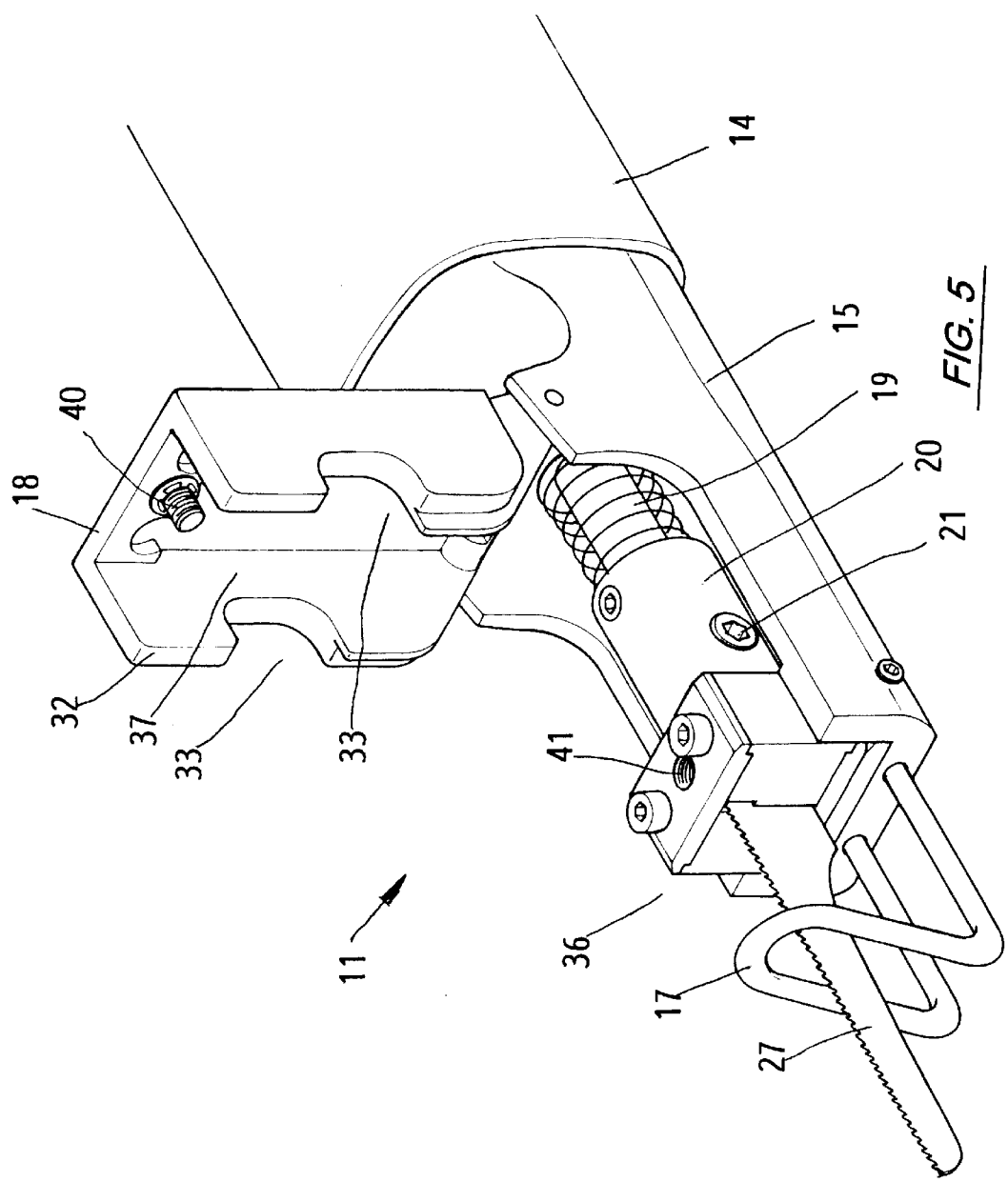
FIG. 5 is a disassembled view of the present invention, showing the structure of the front assembly of the pneumatic saw.

As shown in FIG. 5, it is another embodiment of the pneumatic saw 11, in which a protection lid 18 is hinged to the fixed member 15; the protection lid 18 has a recess portion and a screw 40 in the front center of the lid body 35; the screw 40 is retained in place with a retaining ring; after the lid body 35 is closed, the screw 40 can be set in a screw hole 41 in the saw guide assembly 36 so as to have the lid body 35 of the protection lid 18 covered closely to the fixed member 15. The saw guide assembly 36 on the front of the recess portion 16 of the fixed member 15 should be fastened in place with screws 31. The center of the upper fastening plate 24 has a screw hole 41 to receive a screw so as to fasten the protection lid 18 in place to provide the fixed member with a protection function.

Both side plates 32 of the protection lid 18 are furnished with two elongate holes 33 respectively. The elongate hole 33 is designed to fit the stroke distance of the chuck cylinder 20, i. e., no matter the chuck cylinder 20 stops at any position, it would be opposite to the elongate hole 33 of the side plate 32 always so as to facilitate a hexagon wrench 34 to reach the fastening screw 21 on the chuck cylinder 20 upon removing or replacing the saw blade 27; in that case, the protection lid 18 and the saw guide assembly 36 may not be removed to cause additional cumbersomeness.

In the present invention, the fixed member 15 of the body 14 and the protection lid 18 are furnished with recess portions respectively; the front end of the fixed member 15 is furnished with a saw guide assembly 36; the protection lid 18 mounted on the recess portion 16 is furnished with two elongate holes 33 on both sides thereof respectively. The elongate holes 33 are open holes so as to facilitate a hexagon wrench 34 to reach a fastening screw 21 on the chuck cylinder 20 upon removing or replacing the saw blade 27.

According to the aforesaid description of the embodiments, the present invention has disclosed its features and structure completely, and has provides with an apparent improvement of the kind; it is never anticipated and accomplished by any person in the field; therefore, its structure is deemed unique.

What is claimed is:

1. A protection lid to facilitate replacing saw blade of a pneumatic saw, and said pneumatic saw having a body, of which front end having a fixed member with a recess portion; a chuck cylinder furnished in said recess portion for mounting a saw blade; other end of said chuck cylinder connected with a transmission shaft, and said fixed member furnished with a protection lid having features as follows:

said protection lid furnished with a recess portion corresponding to said fixed member; side plates on both sides of said protection lid being in contact with edges of said fixed member; both side plates of said protection lid furnished with two elongate holes respectively, and position of said two elongate holes being designed at a position within a stroke distance of a fastening screw of said chuck cylinder upon moving back and forth; said elongate holes being designed to receive a hexagon wrench for reaching said fastening screw on said chuck cylinder so as to facilitate replacing said saw blade.

* * * * *